United States Patent
Shi et al.

(10) Patent No.: US 10,014,116 B2
(45) Date of Patent: Jul. 3, 2018

(54) CONDUCTIVE POLYMER COMPOSITION WITH A DUAL CROSSLINKER SYSTEM FOR CAPACITORS

(71) Applicant: Kemet Electronics Corporation, Simpsonville, SC (US)

(72) Inventors: Yaru Shi, Simpsonville, SC (US); Antony P. Chacko, Simpsonville, SC (US); Edgar White, Hampton, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 173 days.

(21) Appl. No.: 14/339,200

(22) Filed: Jul. 23, 2014

(65) Prior Publication Data
US 2015/0029642 A1 Jan. 29, 2015

Related U.S. Application Data

(60) Provisional application No. 61/857,878, filed on Jul. 24, 2013.

(51) Int. Cl.
| | | |
|---|---|---|
| *H01G 9/028* | (2006.01) | |
| *H01G 9/042* | (2006.01) | |
| *H01G 9/15* | (2006.01) | |
| *H01B 1/12* | (2006.01) | |
| *H01G 9/00* | (2006.01) | |
| *C09D 165/00* | (2006.01) | |

(52) U.S. Cl.
CPC ......... *H01G 9/0425* (2013.01); *C09D 165/00* (2013.01); *H01B 1/127* (2013.01); *H01G 9/0036* (2013.01); *H01G 9/028* (2013.01); *H01G 9/15* (2013.01); *C08G 2261/135* (2013.01); *C08G 2261/1424* (2013.01); *C08G 2261/3223* (2013.01); *C08G 2261/51* (2013.01); *C08G 2261/76* (2013.01); *C08G 2261/794* (2013.01); *Y10T 29/417* (2015.01)

(58) Field of Classification Search
CPC .... H01G 9/028; H01G 9/0036; H01G 9/0425; C08G 2261/3232; C08G 2261/1424; C08G 2261/135
See application file for complete search history.

(56) References Cited

U.S. PATENT DOCUMENTS

| | | |
|---|---|---|
| 6,072,694 A | 6/2000 | Hahn et al. |
| 6,191,013 B1 | 2/2001 | Hahn et al. |
| 6,304,427 B1 | 10/2001 | Reed et al. |
| 6,391,379 B1 | 5/2002 | Lessner et al. |
| 6,987,663 B2 | 1/2006 | Merker et al. |
| 7,489,498 B2 | 2/2009 | Izu et al. |
| 7,800,887 B2 | 9/2010 | Iida et al. |
| 7,990,684 B2 | 8/2011 | Sugihara et al. |
| 8,426,542 B2 | 4/2013 | Sugihara et al. |
| 2005/0162815 A1 | 7/2005 | Tseng et al. |
| 2008/0316680 A1 | 12/2008 | Iida et al. |
| 2009/0021894 A1* | 1/2009 | Ning ................ C09D 5/24 361/527 |
| 2010/0091432 A1 | 4/2010 | Sugawara et al. |
| 2010/0136222 A1 | 6/2010 | Furukawa et al. |
| 2010/0165546 A1* | 7/2010 | Yoshida ............ H01G 9/0036 361/525 |
| 2011/0019339 A1 | 1/2011 | Merker et al. |
| 2011/0026191 A1 | 2/2011 | Chacko et al. |
| 2011/0171366 A1* | 7/2011 | Ning ............... H01G 9/0036 427/80 |
| 2011/0205689 A1* | 8/2011 | Vilcova .............. H01G 9/012 361/525 |
| 2012/0063063 A1* | 3/2012 | Qiu ................ H01G 9/0029 361/528 |
| 2012/0256117 A1 | 10/2012 | Sugawara et al. |

FOREIGN PATENT DOCUMENTS

| | | |
|---|---|---|
| EP | 0844284 A4 | 10/1998 |
| JP | 2001-270999 | 10/2001 |
| JP | 2010-077186 | 4/2010 |

* cited by examiner

*Primary Examiner* — Margaret G Moore
(74) *Attorney, Agent, or Firm* — Joseph T. Guy; Patent Filing Specialist, Inc.

(57) ABSTRACT

A capacitor with improved electronic properties is described. The capacitor has an anode, a dielectric on said anode and a cathode on the dielectric. The cathode has a conductive polymer defined as $-(CR^1R^2CR^3R^4-)_x-$ wherein at least one of $R^1$, $R^2$, $R^3$ or $R^4$ comprises a group selected from thiophene, pyrrole or aniline with the proviso that none of $R^1$, $R^2$, $R^3$ or $R^4$ contain —SOOH or COOH; a organofunctional silane; and an organic compound with at least two functional groups selected from the group consisting of carboxylic acid and epoxy.

73 Claims, 2 Drawing Sheets

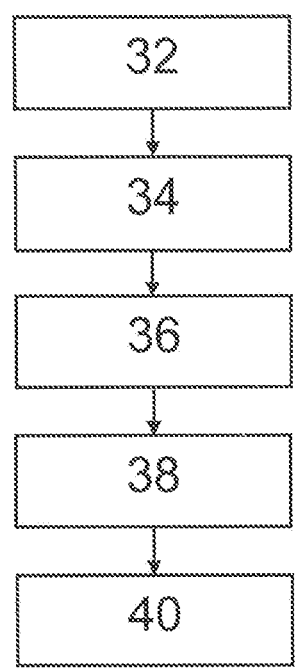

CONDUCTIVE POLYMER COMPOSITION WITH A DUAL CROSSLINKER SYSTEM FOR CAPACITORS

CROSS-REFERENCE TO RELATED APPLICATIONS

The present invention claims priority to U.S. Provisional Patent Application No. 61/857,878 filed Jul. 24, 2013.

BACKGROUND

The present invention is related to an improved polymerization method for preparing solid electrolytic capacitors. More specifically, the present invention is related to an improved method of forming a solid electrolyte capacitor and an improved capacitor formed thereby. Even more specifically, the present invention is related to a capacitor comprising improved crosslinking within the conductive polymeric cathode layer thereby improving adhesion as evidenced by improved ESR and ESR stability.

Electroconductive polymers are widely used in capacitors, solar cells and LED displays. The electroconductive polymers include polypyrrole, polythiophene and polyaniline. Among them, the most commercially successful conductive polymer is poly(3,4-ethylenedioxy thiophene) (PEDOT). One way to apply PEDOT is by forming the PEDOT polymer via in-situ chemical or electrochemical polymerization. The other way is to use it as a PEDOT dispersion preferably with a polyanion, which has much better solubility than PEDOT itself. More particularly, PEDOT-polystyrene sulfonic acid (PEDOT-PSSA) dispersion has gained a lot of attention due to its high conductivity and good film forming property.

Today, almost all electronic components are mounted to the surface of circuit boards by means of infra-red (IR) or convection heating of both the board and the components to temperatures sufficient to reflow the solder paste applied between copper pads on the circuit board and the solderable terminations of the surface mount technology (SMT) components. A consequence of surface-mount technology is that each SMT component on the circuit board is exposed to soldering temperatures that commonly dwell above 180° C. for close to a minute, typically exceeding 230° C., and often peaking above 250° C. If the materials used in the construction of capacitors are vulnerable to such high temperatures, it is not unusual to see significant positive shifts in ESR leading to negative shifts in circuit performance. SMT reflow soldering is a significant driving force behind the need for capacitors having temperature-stable ESR.

Equivalent Series Resistance (ESR) stability of the capacitors requires that the interface between the cathode layer, cathodic conductive layers, conductive adhesive, and leadframe have good mechanical integrity during thermo mechanical stresses. Solid electrolytic capacitors are subject to various thermomechanical stresses during assembly, molding, board mount reflow, etc. During board mount the capacitors are often subjected to temperatures above 250° C. These elevated temperatures create stresses in the interfaces due to coefficient of thermal expansion (CTE) mismatches between adjacent layers. The resultant stress causes mechanical weakening at the interfaces. In some cases this mechanical weakening causes delamination. Any physical separation of the interfaces causes increases in electrical resistance between the layers and thus an increased ESR in the finished capacitor.

PEDOT-PSSA polymer film often does not have enough mechanical strength or sufficient adhesion to the underlying surface. In capacitors, poor film quality and adhesion results in poor ESR or poor ESR stability under processing conditions. Polymeric binders can be added to enhance the mechanical properties of the PEDT-PSSA film and adhesion to the anode. In U.S. Pat. No. 6,987,663, which is incorporated herein by reference, the conductive polymer coating included at least one polymeric organic binder. In U.S. Pat. No. 7,990,684, which is incorporated herein by reference, the conductive polymer coating contains a Novolak polymer resin and a sulfonated polyester as binders.

The polymer binder may be formed "in situ" during the drying step as described in U.S. Published Patent Application 2012/0256117, which is incorporated herein by reference, wherein described is a polymer dispersion of PEDOT-PSSA comprising a polyhydric alcohol and an organic substance having two or more functional groups which can be polycondensed with the polyhyric alcohol to form a polymer binder "in situ".

Another problem associated with PEDOT-Polyanion, especially PEDOT-PSSA conductive polymer film is the hydroscopic property of the polyanions. Polyanions readily absorb water during the capacitor processing steps (for example, dipping coating cycles) or moisture from the environment, and resulted in swelling of the conductive polymer film. The swollen conductive film is typically subjected to drying steps later on. The swelling/shrinking cycles often cause the conductive polymer film to delaminate from the substrate. In capacitor application, it is manifested as deteriorated performance such as positive ESR shift.

EP 0844284, which is incorporated herein by reference, describes a conductive polymer self-doped by —SOOH and/or —COOH functional groups wherein the self-doping groups are on the conductive polymer structure. An advantage of using self-doped conductive polymer over external doped polymer as in the case of PEDT-polyanion dispersion, is the elimination of polyanions which are detrimental to moisture resistance. Still, these self-doped polymer films have poor water or solvent resisting properties. The conductive polymer film's water resistance property can be improved by reacting the self doping groups —SOOH or —COOH with a crosslinking compound having 2 or more functional groups such as a hydroxyl, a silanol, a thiol, an amino or an epoxy group.

For more hydroscopic externally doped PEDOT-PSSA, U.S. Published Patent Application 2010/0091432, which is incorporated herein by reference, described the use of organic substance with a mono epoxy group in PEDOT-PSSA to improve its water resistance. In comparison, an epoxy compound having multiple epoxy groups in the conductive polymer composition resulted in inferior water resistance property and higher ESR.

In spite of the ongoing efforts there is still a significant problem associated with coating stability in electrolytic capacitors utilizing conductive polymer cathodes. Further advances in the art are provided herein.

SUMMARY

It is an object of the invention to provide an improved capacitor.

A particular feature of the invention is a capacitor with lower ESR and improved ESR stability, particularly, after heating.

These and other advantages, as will be realized, are provided in a capacitor. The capacitor has an anode, a dielectric on said anode and a cathode on the dielectric. The cathode has a conductive polymer defined as —(CR$^1$R$^2$CR$^3$R$^4$—)$_x$— wherein at least one of R$^1$, R$^2$, R$^3$ or R$^4$ comprises a group selected from thiophene, pyrrole or aniline with the proviso that none of R$^1$, R$^2$, R$^3$ or R$^4$ contain —SOOH or COOH; a organofunctional silane; and an organic compound with at least two functional groups selected from the group consisting of carboxylic acid and epoxy.

Yet another embodiment is provided in a conductive polymer dispersion comprising a solvent, a conductive polymer, an organofunctional silane and an organic compound with two or more functional groups selected from the group consisting of epoxy and carboxylic acid.

Yet another embodiment is provided in a method for preparing a capacitor comprising:
forming an anode;
forming a dielectric on the anode; and
forming a cathode on the dielectric comprising:
forming a conductive layer comprising:
a conductive polymer defined as —(CR$^1$R$^2$CR$^3$R$^4$—)$_x$— wherein at least one of R$^1$, R$^2$, R$^3$ or R$^4$ comprises a group selected from thiophene, pyrrole or aniline with the proviso that none of R$^1$, R$^2$, R$^3$ or R$^4$ contain —SOOH or COOH;
an organofunctional silane; and
an organic compound with two or more functional groups selected from the group consisting of epoxy and carboxylic acid.

BRIEF DESCRIPTION OF DRAWINGS

FIG. 3 is a flow chart representation of an embodiment of the invention.

DESCRIPTION

The present invention is directed to a dual crosslinker system including the combination of two crosslinking agents, an organofunctional silane and an organic compound with at least two functional groups selected from the group consisting of epoxy and carboxylic acid which provides a surprising synergy when compared with single crosslinker systems. In addition, by using this dual crosslinker system, polymeric organic binders can be avoided in some embodiments, while still achieving lower ESR and improved ESR stability.

The invention will be described with reference to the various figures forming an integral non-limiting component of the disclosure. Throughout the disclosure similar elements will be numbered accordingly.

Figure 1:
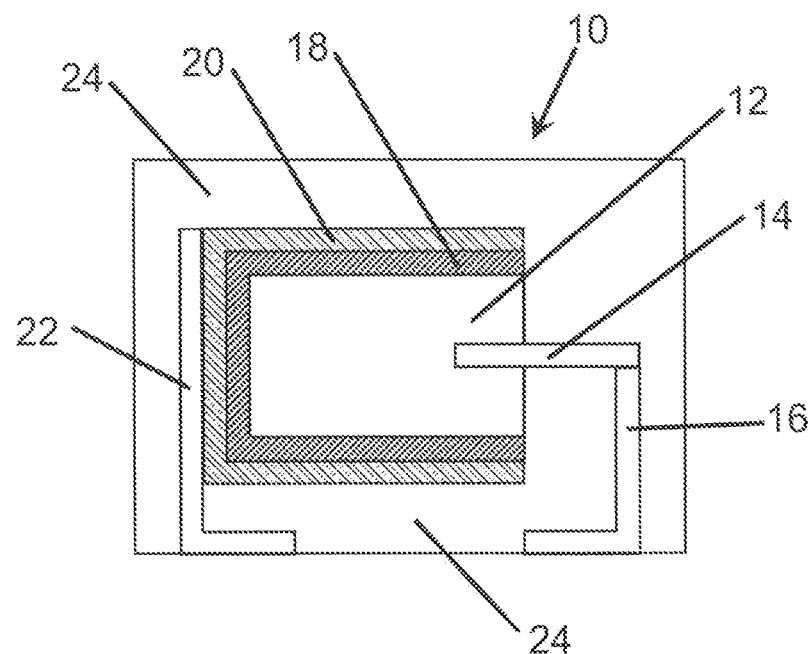
FIG. 1 is a schematic cross-sectional view of an embodiment of the invention.

An embodiment of the invention is illustrated in cross-sectional schematic side view in FIG. 1. In FIG. 1, a capacitor, generally represented at 10, comprises an anode, 12, with an anode lead wire, 14, extending therefrom or attached thereto. The anode lead wire is preferably in electrical contact with an anode lead, 16. A dielectric, 18, is formed on the anode and preferably the dielectric encases at least a portion, and preferably the entire, anode. A cathode, 20, is on the dielectric and encases a portion of the dielectric with the proviso that the cathode and anode are not in direct electrical contact. A cathode lead, 22, is in electrical contact with the cathode. In many embodiments it is preferred to encase the capacitor in a non-conductive resin, 24, with at least a portion of the anode lead and cathode lead exposed for attachment to a circuit board as would be readily understood by one of skill in the art. The cathode may comprise multiple sub-layers. The present invention is directed to improvements in the cathode layer, 20, and more particularly to the formation of the cathode layer.

Figure 2:
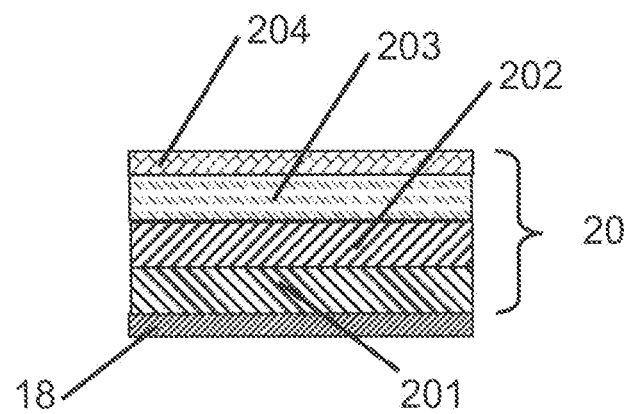
FIG. 2 is a schematic partial cross-sectional view of an embodiment of the invention.

An embodiment of the invention is illustrated in partial cross-sectional schematic view in FIG. 2. In FIG. 2, the cathode, 20, comprises multiple interlayers, 201-204, which are illustrated schematically, wherein the cathode is formed on the dielectric, 18. While not limited thereto the cathode interlayers are preferably selected from layers of conductive polymer, carbon containing layers and metal containing layers most preferably in sequential order. In a particularly preferred embodiment a first interlayer, 201, is at least one conductive polymer layer formed either by in-situ polymerization or by repeated dipping in a slurry of conductive polymer with at least partial drying between dips. It is well understood that soldering a lead frame, or external termination, to a polymeric cathode is difficult. It has therefore become standard in the art to provide conductive interlayers which allow for solder adhesion. A second interlayer, 202, which is preferably at least one carbon interlayer, is typically applied to the conductive polymer interlayer, 201. The carbon interlayer, or series of carbon interlayers, provides adhesion to the conductive polymer interlayer and provides a layer upon which a third interlayer, which is preferably at least one metal containing interlayer, 203, will adequately adhere. Particularly preferred metal containing layers comprise silver, copper or nickel. The metal interlayer allows external terminations, such as a cathode lead to be attached to the cathodic side of the capacitor such as by solder or an adhesive interlayer, 204.

An embodiment of the invention is illustrated in flow chart form in FIG. 3. In FIG. 3, the method of forming a solid electrolytic capacitor of the instant invention is illustrated. In FIG. 3, an anode is provided at 32. A dielectric is formed on the surface of the anode at 34 with a particularly preferred dielectric being the oxide of the anode. A cathode layer is formed at 36 wherein the cathode comprises multiple interlayers. Interlayers may include at least one conducting polymer layer wherein the intrinsically conducting polymer is either formed in-situ or the layer is formed by coating with a slurry comprising intrinsically conducting polymer. The interlayers also preferably comprise at least one carbon containing layer and at least one metal containing layer. Anode and cathode leads are attached to the anode and cathode respectively at 38 and the capacitor is optionally, but preferably, encased at 40 and tested.

The conductive polymer layer may be formed in a single step wherein a slurry is applied comprising at least the conductive polymer and optionally the crosslinkers, and any adjuvants such as binder, dopant, organic acid and the like. Alternatively, the conductive polymer layer may be formed in multiple steps wherein components of the layer are applied separately. In one embodiment a conductive polymer layer is coated after coating one or both crosslinkers. In another embodiment the conductive polymer is applied in concert with a first crosslinker followed by application of the second crosslinker. Separating the components and applying them sequentially instead of in concert is beneficial in some embodiments since the mixture of conductive polymer and crosslinkers may react prematurely thereby decreasing the pot-life of the slurry. In a particularly preferred embodiment the conductive polymer and glycidyl silane are in one slurry with the second crosslinker, such as glycidyl ether, applied separately and preferably after application of slurry containing the conductive polymer.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. An anode consisting essentially of Ta is most preferred. Conductive polymeric materials may be employed as an anode material. Particularly preferred conductive polymers include polypyrrole, polyaniline and polythiophene.

The cathode is a conductor preferably comprising a conductive polymeric material. Particularly preferred conductive polymers include intrinsically conductive polymers most preferably selected from polypyrrole, polyaniline and polythiophene. Metals can be employed as a cathode material with valve metals being less preferred. The cathode may include multiple interlayers wherein adhesion layers are employed to improve adhesion between the conductor and the termination. Particularly preferred adhesion interlayers include carbon, silver, copper, or another conductive material in a binder. The cathode is preferably formed by dipping, coating or spraying either a slurry of conductive polymer or a conductive polymer precursor which is polymerized by an oxidant as known in the art. Carbon and metal containing layers are typically formed by dipping into a carbon containing liquid or by coating. The carbon containing layers and metal containing layers can be formed by electroplating and this is a preferred method, in one embodiment, particularly for the metal containing layer.

The dielectric is a non-conductive layer which is not particularly limited herein. The dielectric may be a metal oxide or a ceramic material. A particularly preferred dielectric is the oxide of a metal anode due to the simplicity of formation and ease of use. The dielectric is preferably formed by dipping the anode into an anodizing solution with electrochemical conversion. Alternatively, a dielectric precursor can be applied by spraying or printing followed by sintering to form the layer. When the dielectric is an oxide of the anode material dipping is a preferred method whereas when the dielectric is a different material, such as a ceramic, a spraying or coating technique is preferred.

The anode lead wire is chosen to have low resistivity and to be compatible with the anode material. The anode lead wire may be the same as the anode material or a conductive oxide thereof. Particularly preferred anode lead wires include Ta, Nb and NbO. The shape of the anode lead wire is not particularly limiting. Preferred shapes include round, oval, rectangular and combinations thereof. The shape of the anode lead wire is preferably chosen for optimum electrical properties.

The conductive polymer has a backbone defined as $-(CR^1R^2-CR^3R^4-)_x-$ wherein at least one of $R^1$, $R^2$, $R^3$ or $R^4$ comprises a group selected from thiophene, pyrrole or aniline which may be substituted wherein subscript x is at least 2 to no more than 1000. None of $R^1$, $R^2$, $R^3$ or $R^4$ contain —SOOH or COOH. Hydrogen and lower alkyls of less than five carbons are particularly suitable. Thiophenes are particularly preferred with poly(3,4-ethylenedioxythiophene) being most preferred.

The conductive polymer layer comprises two crosslinkers which function synergistically to provide an improved capacitor with lower ESR. The first crosslinker is an organofunctional silane and the second is an organic compound with at least two functional groups selected from epoxy and carboxylic acid. Organofunctional silane, more particularly, glycidyl silane crosslinkers have been taught in the art, however, it is widely known that excessive amounts of silane crosslinker makes dried conductive polymer film rigid and fragile, consequently ESR and ESR stability suffer with increased concentration of silane. Therefore, the artisan has been limited to the amount of crosslinking to be achieved since the concentration of silane in the conductive polymer must be limited to minimize ESR. Organofunctional silane has never reached the theoretical potential as a crosslinker in capacitors.

Organic compounds with one epoxy group have been taught in the art to enhance water resistance, as described in U.S. Published Patent Application 2010/0091432. However, if more than one epoxy group is utilized the water resistance is not improved as much. The teaching from prior art is that crosslinking compounds with more than one functional crosslinking group become sterically bulky after the crosslinking reaction, which prevents them from spreading into the conductive polymer homogeneously and therefore they fail to improve the water resistance effectively. Organic compounds with more than one epoxy group have therefore been considered unsuitable for use in electronic capacitors since the polymeric cathode layer tends to delaminate due to excessive water absorption thereby rendering the capacitor useless.

It is surprising that the combination of organofunctional silane and organic compound with more than one crosslinking group, especially more than one epoxy group, react synergistically providing a much lower ESR at a given level of organofunctional silane without an increase in water absorption as would be expected, particularly for the epoxy crosslinking compound with more than one epoxy group. This unexpected synergism allows for the use of a higher concentration of organofunctional silane and epoxy crosslinking compound combined, and therefore more crosslinking sites, than previously considered possible. The increase in crosslinking increases the structural integrity of the conductive polymer layer as evidenced by lower ESR.

It is even more surprising that the combination of organofunctional silane and organic compound with more than one carboxylic group also shows a synergistic function and provides a much lower ESR at a given level of organofunctional silane. Carboxylic groups are not considered reactive toward —SOOH or —COOH groups under normal capacitor processing conditions as described in "Mixed sulfonic-carboxylic anhydrides. I. Synthesis and thermal stability. New syntheses of sulfonic anhydrides", by Yehuda Mazur, Michael H. Karger, J. Org. Chem., 1971, 36 (4), pp 528-531. The ESR improvement may be attributed to reactions between the organofunctional silane and the carboxylic crosslinking compound, and other components of the conductive polymer dispersion. Herein, although we discuss dual crosslinker systems of organosilane and epoxy crosslinking compound or dual crosslinker systems of organosilane and carboxylic crosslinking system, a multi-crosslinker system than contains 3, or 4, or even more crosslinkers is envisioned.

The organofunctional silane concentration may range from about 0.05 wt % to about 10 wt % of the conductive polymer dispersion at a percent solids of about 0.2 to 10 wt %. More preferably, the organofunctional silane concentration may range from about 0.1 wt % to about 5 wt % of the conductive polymer and even more preferably about 0.1 wt % to about 2 wt %.

Organofunctional silane is defined by the formula:

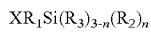

wherein X is an organic functional group such as amino, epoxy, anhydride, hydroxy, mercapto, sulfonate, carboxylate, phosphonate, halogen, vinyl, methacryloxy, ester, alkyl, etc; $R_1$ is an aryl or alkyl $(CH_2)_m$ wherein m can be 0 to 14; $R_2$ is individually a hydrolysable functional group such as alkoxy, acyloxy, halogen, amine or their hydrolyzed product; $R_3$ is individually an alkyl functional group of 1-6 carbons; n is 1 to 3.

The organofunctional silane can also be dipodal, define by the formula:

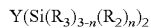

wherein Y is any organic moiety that contains reactive or nonreactive functional groups, such as alkyl, aryl, sulfide or melamine; $R_3$, $R_2$ and n are defined above. The organofunctional silane can also be multi-functional or polymeric silanes, such as silane modified polybutadiene, or silane modified polyamine, etc.

Examples of organofunctional silane include 3-glycidoxypropyltrimethoxysilane, 3-aminopropyltriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane, bis(triethoxysilyl)octane, etc. The examples are used to illustrate the invention and should not be regarded as conclusive.

A particularly preferred organofunctional silane is glycidyl silane defined by the formula:

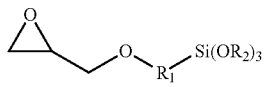

wherein $R_1$ is an alkyl of 1 to 14 carbons and more preferably selected from methyl ethyl and propyl; and each $R_2$ is independently an alkyl or substituted alkyl of 1 to 6 carbons.

A particularly preferred glycidyl silane is 3-glycidoxypropyltrimethoxysilane defined by the formula:

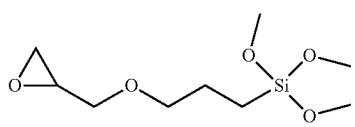

which is referred to herein as "Silane A" for convenience.

The second crosslinker, which is an organic compound with at least two functional groups selected from epoxy and carboxylic acid, has a concentration preferred range from about 0.1 wt % to about 10 wt % of the conductive polymer dispersion at a percents solids of about 0.2 to about 10 wt %. More preferably, the glycidyl ether concentration may range from about 0.2 wt % to about 5 wt % of the conductive polymer and even more preferably about 0.2 wt % to about 2 wt %.

The second crosslinker with at least two epoxy groups is referred to herein as an epoxy crosslinking compound and is defined by the formula:

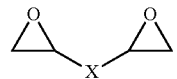

wherein the X is an alkyl or substituted alkyl of 0-14 carbons, preferably 0-6 carbons; an aryl or substituted aryl, an ethylene ether or substituted ethylene ether, polyethylene ether or substituted polyethylene ether with 2-20 ethylene ether groups or combinations thereof. A particularly preferred substitute is an epoxy group.

Examples of epoxy crosslinking compounds having more than one epoxy groups include ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, etc.

A preferred epoxy crosslinking compound is glycidyl ether, defined by the formula:

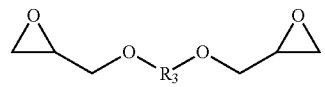

wherein $R_3$ is an alkyl or substituted alkyl of 1-14 carbons, preferably 2-6 carbons; an ethylene ether or polyethylene ether with 2-20 ethylene ether groups; a alkyl substituted with a group selected from hydroxy, or

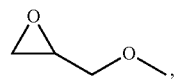

or

—$(CH_2OH)_xCH_2OH$ wherein X is 1 to 14.

Particularly preferred glycidyl ethers are represented by:

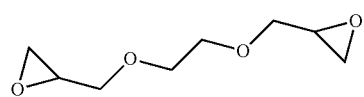 [SMILES: C(COCC1CO1)OCC1CO1]

EGDGE: ethylene glycol diglycidyl ether

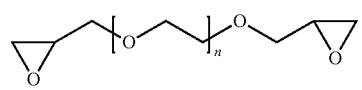

where n is an integer of 1 to 220;

PEGDGE: polyethylene glycol diglycidyl ether

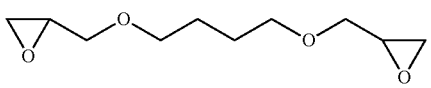

BDDGE: 1,4-butanediol diglycidyl ether

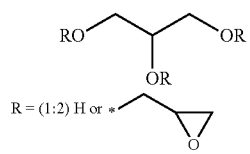

GDGE: glycerol diglycidyl ether

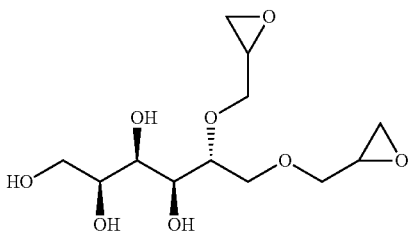 [SMILES: OC[C@H](O)[C@@H](O)[C@H](O)[C@@H](COCC1CO1)OCC1CO1]

Sorbitol-DGE: sorbitol diglycidyl ether

The organic compound with at least two carboxylic functional groups is referred to herein as a carboxylic crosslinking compound.

Examples of carboxylic crosslinking compounds include but are not limited by, oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid, polyacrylic acid, etc. Particularly preferred organic acids are aromatic acid such as phthalic acid, and particularly ortho-phthalic acid, which decreases ESR. The reaction of the crosslinkable functionality and the crosslinkers occurs at elevated temperature which occurs during the normal processing steps of capacitor manufacture.

The construction and manufacture of solid electrolyte capacitors is well documented. In the construction of a solid electrolytic capacitor a valve metal preferably serves as the anode. The anode body can be either a porous pellet, formed by pressing and sintering a high purity powder, or a foil which is etched to provide an increased anode surface area. An oxide of the valve metal is electrolytically formed to cover up to all of the surfaces of the anode and to serve as the dielectric of the capacitor. The solid cathode electrolyte is typically chosen from a very limited class of materials, to include manganese dioxide or electrically conductive organic materials including intrinsically conductive polymers, such as polyaniline, polypyrol, polythiophene and their derivatives. The solid cathode electrolyte is applied so that it covers all dielectric surfaces and is in direct intimate contact with the dielectric. In addition to the solid electrolyte, the cathodic layer of a solid electrolyte capacitor typically consists of several layers which are external to the anode body. In the case of surface mount constructions these layers typically include: a carbon layer; a cathode conductive layer which may be a layer containing a highly conductive metal, typically silver, bound in a polymer or resin matrix; and a conductive adhesive layer such as silver filled adhesive. The layers including the solid cathode electrolyte, conductive adhesive and layers there between are referred to collectively herein as the cathode which typically includes multiple interlayers designed to allow adhesion on one face to the dielectric and on the other face to the cathode lead. A highly conductive metal lead frame is often used as a cathode lead for negative termination. The various layers connect the solid electrolyte to the outside circuit and also serve to protect the dielectric from thermo-mechanical damage that may occur during subsequent processing, board mounting, or customer use.

In the case of conductive polymer cathodes the conductive polymer is typically applied by either chemical oxidation polymerization, electrochemical oxidation polymerization or by dipping, spraying, or printing of pre-polymerized dispersions.

In one embodiment the conductive polymer layer is added as a slurry wherein the slurry is applied to a surface by dipping or coating. The slurry comprises a solvent, preferably water, the conductive polymer, preferably poly(3,4-ethylenedioxythiophene), a organofunctional silane and a second crosslinker which is an organic compound with at least two functional groups selected from epoxy and carboxylic acid. The solvent is preferably polar solvents, such as water, alcohols or acetonitrile, and a mixture of water with polar solvent, with water being the most preferred solvent. The solvent is in sufficient ratio to achieve a viscosity suitable for achieving an adequate coating with additional solvent being undesirable as the solvent is typically removed after application. The organofunctional silane is preferably present in an amount of 0.0005-0.1000 grams per gram of conductive polymer dispersion. More preferably the organofunctional silane is preferably present in an amount of 0.001-0.050 grams per gram of conductive polymer dispersion. The second crosslinker is preferably present in an amount of 0.001-0.100 grams per gram of conductive polymer. More preferably the epoxy crosslinking compound or the carboxylic crosslinking compound is preferably present in an amount of 0.002-0.050 grams per gram of conductive polymer.

Apart from the conductive polymer, solvent, organofunctional silane and the second crosslinker, the slurry may further comprise other additives such as conductivity enhancing additives, surface-active substances, coverage enhancing additives and optionally a polymer binder.

Organic acids, and particularly aromatic organic acids are beneficial in some embodiments of the slurry and in the capacitor formed by the slurry. Examples of organic acids can include, formic acid, acetic acid, propanoic acid, oxalic acid, malonic acid, succinic acid, glutaric acid, adipic acid, pimelic acid, suberic acid, azelaic acid, sebacic acid, dodecanedioic acid, benzoic acid, phthalic acids, maleic acid, muconic acid, etc. Particularly preferred organic acids are phthalic acid, and particularly ortho-phthalic acid, and benzoic acid both of which further decrease ESR and improve coverage. The slurry preferably comprises 0-0.10 grams of organic acid per gram of conductive polymer dispersion.

The slurry may contain surface active additives such as acetylenic diols, alkyl carboxylates, alkyl sulfate, alkyl sulfonate, fluoroalkyl surfactant or any other surface active substances.

The slurry may contain conductive enhancing additives such as dimethylsulfoxide (DMSO), dimethylformamide (DMF), dimethylacetamide (DMAc), ethylene glycol, propylene glycol, etc.

The conductive polymer layer preferably comprises a dopant, and more preferably a polyanion dopant. The polyanion dopant can be present in an amount of up to 90 wt % even though not all polyanion functions as a dopant. It is preferable to have a dopant concentration from about 5 wt % to about 30 wt %, more preferably 12 wt % to about 25 wt % and most preferably about 21 wt %. Any suitable dopant may be used such as 5-sulfosalicylic acid, dodecylbenzenesulfonate, p-toluenesulfonate or chloride. A particularly exemplary dopant is p-toluenesulfonate. A particularly preferred polyanion dopant is polystyrene sulfonic acid.

The carbon layer serves as a chemical barrier between the solid electrolyte and the silver layer. Critical properties of the layer include adhesion to the underlying layer, wetting of the underlying layer, uniform coverage, penetration into the underlying layer, bulk conductivity, interfacial resistance, compatibility with the silver layer, buildup, and mechanical properties.

The cathodic conductive layer, which is preferably a silver layer, serves to conduct current from the lead frame to the cathode and around the cathode to the sides not directly connected to the lead frame. The critical characteristics of this layer are high conductivity, adhesive strength to the carbon layer, wetting of the carbon layer, and acceptable mechanical properties.

Throughout the description stated ranges, such as 0-6 or 0.1-0.6 refer to all intermediate ranges with the same number of significant figures as the highest significant figure listed.

EXAMPLES

Preparation of PEDOT-PSSA and Conductive Polymer Dispersion

A 4 L plastic jar, provided with a cooling jacket, was initially charged with 125 g of PSSA, 2531 g of DI water, 28.5 g of 1% iron(III) sulphate, and 21.5 g of sodium peroxodisulphate. The contents were mixed using a rotor-stator mixing system with perforated stator screen with a round hole diameter of 1.6 mm. Subsequently, 11.25 g of 3,4-ethylenedioxythiophene (PEDOT) was added dropwise. The reaction mixture was sheared continuously with a shear speed of 8000 RPM with the rotor-stator mixing system for an additional 23 hours. The dispersion was treated with cationic and anionic exchange resin and filtered to get PEDOT-PSSA base slurry.

Conductive polymer dispersion was prepared by mixing PEDOT-PSSA base slurry with other additives and cross-linkers.

Capacitor Manufacturing Example 1

A series of tantalum anodes (33 microfarads, 25V) were prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodes. This process was repeated until a sufficient thickness was achieved. The conductive polymer dispersion was applied to form an external polymer layer. After drying, alternating layers of decanediamine toluenesulfonate and conductive polymer dispersion was applied and repeated 4-5 more times. The anodes with conductive polymer layer were washed and dried, followed by sequential coating of a graphite layer and a silver layer to produce a solid electrolytic capacitor. Parts were assembled, packaged and surface mounted. ESR was measured before and after surface mount.

Capacitor Manufacturing Example 2

A series of tantalum anodes (330 microfarads, 6V) were prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodes. This process was repeated until a sufficient thickness was achieved. Conductive polymer dispersion was applied to form an external polymer layer. After drying, this process was repeated 2 more times, followed by sequential coating of a graphite layer and a silver layer to produce a solid electrolytic capacitor. Parts were assembled, packaged and surface mounted. ESR was measured before and after surface mount.

Comparative Example 1

To 120 g of the PEDOT-PSSA conductive polymer was added 4.8 g of DMSO and 0.48 g of 3-glycidoxypropyltrimethoxysilane (Silane A). The conductive polymer dispersion was mixed in a container by rolling overnight. The solid capacitor was produced following the process in Capacitor Manufacturing Example 1.

Comparative Example 2

Same as Comparative Example 1, except that 0.96 g of Silane A was used to prepare the conductive polymer dispersion.

Comparative Example 3

Same as Comparative Example 1, except that 1.44 g of Silane A was used to prepare the conductive polymer dispersion.

Inventive Example 1

To 120 g of the PEDOT-PSSA conductive polymer was added 4.8 g of DMSO, 0.48 g of Silane A and 0.96 g of EGDGE. The conductive polymer dispersion was mixed in a container by rolling overnight. The solid capacitor was produced following the process in Capacitor Manufacturing Example 1.

To 120 g of the PEDOT-PSSA conductive polymer was added 4.8 g of DMSO, 0.96 g of Silane A and 0.48 g of EGDGE. The conductive polymer dispersion was mixed in a container by rolling overnight. The solid capacitor was produced following the process in Capacitor Manufacturing Example 1.

To compare the dual crosslinker system with single crosslinker system using glycidyl silane crosslinker a series of comparative polymer slurries were prepared with various amounts of 3-glycidoxypropyltrimethoxysilane (Comparative Example 1-3) as presented in Table 1. A tantalum capacitor was formed using the polymer slurry to form the polymeric cathode layer. Anode and cathode terminations were formed in identical manner using conventional technologies. As noted therein, ESR increased with increasing crosslinker which is contrary to the desire in the art. Inventive samples were prepared using various amounts of silane crosslinker with various amounts of EDDGE crosslinker as presented in Table 1. The ESR was measured with the results reproduced in Table 1. The results clearly illustrate the synergistic effect of improved ESR resulting from the inventive dual crosslinker system.

TABLE 1

| Examples | Crosslinkers | ESR (mΩ) |
|---|---|---|
| Comp. 1 | Silane A 0.4% | 39.77 |
| Comp. 2 | Silane A 0.8% | 44.49 |
| Comp. 3 | Silane A 1.2% | 46.91 |
| Inv. 1 | Silane A 0.4%, EGDGE 0.8% | 30.93 |
| Inv. 2 | Silane A 0.8%, EGDGE 0.4% | 36.83 |

Comparative Example 4

To 80 g of the PEDOT-PSSA conductive polymer was added 3.2 g of DMSO, 0.32 g of Silane A and 2.56 g of a commercial polyester binder (44% aqueous dispersion). The conductive polymer dispersion was mixed in a container by rolling overnight. The solid capacitor was produced following the process in Capacitor Manufacturing Example 1.

Comparative Example 5

A commercial PEDOT-PSSA conductive polymer dispersion Clevios™ K from Heraeus of Leverkusen/Germany (KV2) was used to produce the solid capacitor following the process in Capacitor Manufacturing Example 1.

Inventive Example 3

To 80 g of the PEDOT-PSSA conductive polymer was added 3.2 g of DMSO, 0.32 g of Silane A and 0.64 g of PEGDGE. The conductive polymer dispersion was mixed in a container by rolling overnight. The solid capacitor was produced following the process in Capacitor Manufacturing Example 1.

Inventive Example 4

Same as Comparative Example 4, except that BDDGE instead of PEGDGE was used to prepare the conductive polymer dispersion.

Inventive Example 5

Same as Comparative Example 4, except that GDGE instead of PEGDGE was used to prepare the conductive polymer dispersion.

Inventive Example 6

Same as Comparative Example 4, except that Sorbitol-DGE instead of PEGDGE was used to prepare the conductive polymer dispersion.
A series of diglycidyl ether crosslinker slurry were prepared in Example 3-6 with the components and their levels presented in Table 2. Capacitors were formed using the slurry as in Capacitor Manufacturing Example 1 and the ESR was measured before and after conventional mounting using conventional surface mount technology (SMT) with a reflow temperature of 260° C. Comparative Example 4 was identically prepared utilizing Silane A and a commercial polyester binder. Comparative example 5 used a commercial polymer slurry KV2. All inventive examples showed similarly lower ESR values compared with the two comparative examples under the experimental condition. After SMT mounting, all inventive examples showed no detrimental ESR shift and are much more stable than the comparative examples.

TABLE 2

| Examples | Crosslinkers | Pre Mount ESR(mΩ) | Post Mount SMT ESR (mΩ) |
|---|---|---|---|
| Inv. 3 | Silane A 0.4%, PEGDGE 0.8% | 34.99 | 32.30 |
| Inv. 4 | Silane A 0.4%, BDDGE 0.8% | 33.31 | 30.36 |
| Inv. 5 | Silane A 0.4%, GDGE 0.8% | 32.82 | 30.21 |
| Inv. 6 | Silane A 0.4%, Sorbitol-DGE 0.8% | 31.88 | 29.21 |
| Comp. 4 | Silane A 0.4% Commercial polyester binder 1.4% | 48.83 | 58.86 |
| Comp. 5 | Commercial conductive polymer dispersion (KV2) | 32.25 | 56.54 |

Comparative Example 6

To 200 g of the PEDOT-PSSA conductive polymer was added 8 g of DMSO and 0.8 g of Silane A. The conductive polymer dispersion was mixed in a container by rolling overnight. The solid capacitor was produced following the process in Capacitor Manufacturing Example 1.

Comparative Example 7

To 200 g of the PEDOT-PSSA conductive polymer was added 8 g of DMSO and 0.8 g of Silane A. The conductive polymer dispersion was mixed in a container by rolling overnight. The solid capacitor was produced following the process in Capacitor Manufacturing Example 2.

Inventive Example 7

To 200 g of the PEDOT-PSSA conductive polymer was added 8 g of DMSO, 0.8 g of Silane A and 2 g of o-phthalic acid (PA). The conductive polymer dispersion was mixed in a container by rolling overnight. The solid capacitor was produced following the process in Capacitor Manufacturing Example 1.

Inventive Example 8

To 200 g of the PEDOT-PSSA conductive polymer was added 8 g of DMSO, 0.8 g of Silane A and 2 g of o-phthalic acid (PA). The conductive polymer dispersion was mixed in a container by roller overnight. The solid capacitor was produced following the process in Capacitor Manufacturing Example 2.

The dual crosslinker system using glycidyl silane crosslinker and phthalic acid crosslinker showed improved ESR and ESR stability relative to the comparative examples using only the silane crosslinker.

TABLE 3

| NB# | Crosslinkers | ESR (mΩ) |
|---|---|---|
| Comp. 6 | Silane A 0.4% | 38.3 |
| Inv. 7 | Silane A 0.4%, PA 1% | 31.8 |
| Comp. 7 | Silane A 0.4% | 54.6 |
| Inv. 8 | Silane A 0.4%, PA 1% | 28.8 |

Inventive Example 9

To 80 g of the PEDOT-PSSA conductive polymer was added 3.2 g of DMSO, 0.32 g of Silane A and 0.56 g of EGDGE. The conductive polymer dispersion was mixed in a container by rolling overnight. The solid capacitor was produced following the process in Capacitor Manufacturing Example 1.

Inventive Example 10

Same as Comparative Example 9, except that 0.64 g of GDGE instead of EGDGE was used to prepare the conductive polymer dispersion.

Inventive Example 11

Same as Comparative Example 9, except that 0.72 g of Sorbitol-DGE instead of EGDGE was used to prepare the conductive polymer dispersion.

Inventive Example 12

To 80 g of the PEDOT-PSSA conductive polymer was added 3.2 g of DMSO, 0.32 g of Silane A, 0.56 g of PA and 0.56 g of EGDGE. The conductive polymer dispersion was mixed in a container by rolling overnight. The solid capacitor was produced following the process in Capacitor Manufacturing Example 1.

Inventive Example 13

To 80 g of the PEDOT-PSSA conductive polymer was added 3.2 g of DMSO, 0.32 g of Silane A, 0.64 g of GDGE and 0.48 g of PA. The conductive polymer dispersion was mixed in a container by rolling overnight. The solid capacitor was produced following the process in Capacitor Manufacturing Example 1.

Inventive Example 14

To 80 g of the PEDOT-PSSA conductive polymer was added 3.2 g of DMSO, 0.32 g of Silane A, 0.40 g of PA and 0.72 g of Sorbitol-DGE. The conductive polymer dispersion was mixed in a container by rolling overnight. The solid capacitor was produced following the process in Capacitor Manufacturing Example 1.

Conductive polymer slurries were prepared as above with, in some instances, the additional incorporation of ortho-phthalic acid. The addition of ortho-phthalic acid had two benefits: further ESR reduction and improved anode edge and corner coverage. The edge and corner coverage was rated by visual observation and 99% means that all corners and edges are covered.

TABLE 4

| Examples | Crosslinkers | Pre Mount ESR (mΩ) | Post Mount SMT ESR (mΩ) | $4^{th}$ Slurry Cycle Coverage % | 5th Slurry Cycle Coverage % |
|---|---|---|---|---|---|
| Inv. 9 | Silane A 0.4% EGDGE 0.7% | 34.13 | 34.03 | 95% | 96% |
| Inv. 10 | Silane A 0.4% GDGE 0.8% | 34.15 | 34.98 | 97% | 98% |
| Inv. 11 | Silane A 0.4% Sorbitol-DGE 0.9% | 30.87 | 30.03 | 97% | 99% |
| Inv. 12 | Silane A 0.4% EGDGE 0.7% PA 0.7% | 32.41 | 29.83 | 96% | 98% |
| Inv. 13 | Silane A 0.4%, GDGE 0.8%, PA 0.6% | 34.59 | 31.94 | 98% | 99% |
| Inv. 14 | silane 0.4%, Sorbitol-DGE 0.9%, PA 0.5% | 31.75 | 30.50 | 98% | 99% |

Comparative Example 8

Same as Comparative Example 5.

Inventive Example 15

To 600 g of the PEDOT-PSSA conductive polymer was added 24 g of DMSO and 2.4 g of Silane A. The conductive polymer dispersion was mixed in a container by rolling overnight. The solid capacitor was produced following the process in Capacitor Manufacturing Example 1, except that after the conductive polymer layer was applied, the anode was soaked in 2.5% of EGDGE ethanol solution for 5 minute and dried to form a crosslinker coating. The rest of the anode manufacturing process remained the same.

Inventive Example 16

Same as Inventive Example 15, except that 2.5% of Sorbitol-DGE ethanol solution was used instead of EGDGE ethanol solution.

The dual crosslinker can also be applied separately in two steps. The $1^{st}$ crosslinker Silane A was included in the conductive polymer dispersion, the $2^{nd}$ crosslinker (glycidyl ether) was applied as a separate coating afterwards. This process again showed better ESR than the commercial conductive polymer dispersion KV2 applied in one step coating.

TABLE 5

| Examples | Crosslinker Coating | Pre Mount ESR (mΩ) | Post Mount SMT ESR (mΩ) |
|---|---|---|---|
| Inv. 15 | 2.5% EGDGE ethanol solution | 31.58 | 27.62 |
| Inv. 16 | 2.5% Sorbitol-DGE ethanol solution | 29.23 | 30.57 |
| Comp.8 | Commercial conductive polymer dispersion (KV2) | 36.61 | 44.41 |

The dual crosslinker system demonstrated good ESR and ESR stability when compared with single crosslinker system or polymeric binders, even in the situation when one of the crosslinker can't readily crosslink the conductive polymer PEDOT-PSSA itself. The surprisingly good electrical performance can only be attributed to the synergy of the two different types of crosslinkers, either by crosslinking reactions between them, or with other components in the conductive polymer dispersion.

The invention has been described with particular reference to preferred embodiments without limit thereto. One of skilled in the art would realize additional embodiments and improvements which are not specifically enumerated but which are within the scope of the invention as specifically set forth in the claims appended hereto.

The invention claimed is:

1. A capacitor comprising:
an anode;
a dielectric on said anode;
a cathode on said dielectric wherein said cathode comprises:
a first layer closest to said dielectric comprising poly(3,4-ethylenedioxythiophene) and a toluene sulphonate; and
a second layer comprising a conductive polymer comprising repeating units of —(CR$^1$R$^2$CR$^3$R$^4$) wherein at least one of R$^1$, R$^2$, R$^3$ or R$^4$ comprises a group selected from thiophene, pyrrole or aniline with the proviso that none of R$^1$, R$^2$, R$^3$ or R$^4$ contain SOON or COOH;
0.0005 to 0.1000 grams of an organofunctional silane per gram of said conductive polymer; and
0.001 to 0.100 grams of an organic compound per gram of said conductive polymer with at least two functional groups selected from the group consisting of carboxylic acid and epoxy.

2. The capacitor of claim 1 wherein said cathode further comprises a polyanion.

3. The capacitor of claim 2 wherein said polyanion is polystyrene sulfonic acid.

4. The capacitor of claim 1 wherein said conductive polymer comprises a polythiophene.

5. The capacitor of claim 4 wherein said conductive polymer is poly(3,4-ethylenedioxythiophene).

6. The capacitor of claim 1 wherein said organofunctional silane is a glycidyl silane.

7. The capacitor of claim 6 wherein said glycidyl silane is defined by the formula:

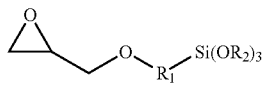

wherein R$_1$ is an alkyl of 1 to 14 carbons; and
each R$_2$ is independently an alkyl of 1 to 6 carbons.

8. The capacitor of claim 7 wherein said R$_1$ is selected from the group consisting of methyl, ethyl and propyl.

9. The capacitor of claim 7 wherein said glycidyl silane is defined by the formula:

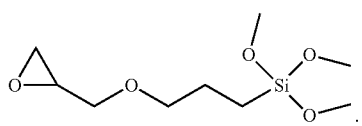

10. The capacitor of claim 1 wherein said organofunctional silane is defined by the formula:

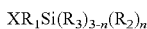

wherein X is an organic functional group selected from the group consisting of amino, epoxy, anhydride, hydroxy, mercapto, sulfonate, carboxylate, phosphonate, halogen, vinyl, methacryloxy, ester and alkyl;
R$_1$ is an aryl or (CH$_2$)$_m$ wherein m can be 0 to 14;
R$_2$ is individually a hydrolysable functional group;
R$_3$ is individually an alkyl functional group of 1-6 carbons; and
n is 1 to 3.

11. The capacitor of claim 10 wherein said hydrolysable functional group is selected from the group consisting of alkoxy, acyloxy, halogen and amine.

12. The capacitor of claim 1 wherein said organofunctional silane is defined by the formula:

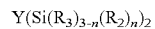

wherein Y is any organic moiety that contains reactive or nonreactive functional groups such as alkyl, aryl, sulfide or melamine;
R$_2$ is individually a hydrolysable functional group;
R$_3$ is individually an alkyl functional group of 1-6 carbons; and
n is 1 to 3.

13. The capacitor of claim 1 wherein said organofunctional silane is selected from the group consisting of: 3-glycidoxypropyltrimethoxysilane, 3-aminopropyltriethoxysilane, aminopropylsilanetriol, (triethoxysilyl)propylsuccinic anhydride, 3-mercaptoprpyltrimethoxysilane, vinyltrimethoxysilane, 3-metacryloxypropyltrimethoxysilane, 3-trihydroxysilyl-1-propane sulfonic acid and octyltriethyoxysilane.

14. The capacitor of claim 1 wherein said organic compound is an epoxy crosslinking compound.

15. The capacitor of claim 14 wherein said epoxy crosslinking compound is defined by the formula:

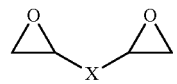

wherein the X is an alkyl or substituted alkyl of 0-14 carbons, an aryl or substituted aryl, an ethylene ether or substituted ethylene ether, polyethylene ether or substituted polyethylene ether with 2-20 ethylene ether groups or combinations thereof.

16. The capacitor of claim 15 wherein said substitute is an epoxy group.

17. The capacitor of claim 15 wherein alkyl or substituted alkyl has 0-6 carbons.

18. The capacitor of claim 15 wherein said epoxy crosslinking compound is selected from the group consisting of: ethylene glycol diglycidyl ether, propylene glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl ether, glycerol polyglycidyl ethers, diglycerol polyglycidyl ethers, trimethylolpropane polyglycidyl ethers, sorbitol diglycidyl ether, sorbitol polyglycidyl ether, polyethylene glycol diglycidyl ether, polypropylene glycol diglycidyl ether, polytetramethylene glycol diglycidyl ether, di(2,3-epoxypropyl) ether, 1,3-butadiene diepoxide, 1,5-hexadiene diepoxide, 1,2,7,8-diepoxyoctane, 1,2,5,6-Diepoxycyclooctane, 4-vinyl cyclohexene diepoxide, bisphenol diglycidyl ether and a maleimide-epoxy compound.

19. The capacitor of claim 14 wherein said epoxy crosslinking compound is a glycidyl ether.

20. The capacitor of claim 19 wherein said glycidyl ether is defined by the formula:

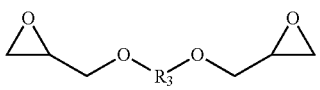

wherein $R_3$ is an alkyl or substituted alkyl of 1-14 carbons or the atoms necessary to form at least one ethylene ether linkage.

21. The capacitor of claim 20 wherein said $R_3$ is an alkyl or substituted alkyl of 2-6 carbons.

22. The capacitor of claim 20 wherein said $R_3$ is a polyethylene ether.

23. The capacitor of claim 22 wherein said polyethylene ether has 2-220 polymerized ethylene ether groups.

24. The capacitor of claim 20 wherein said $R_3$ is an alkyl substituted with a group selected from the group consisting of hydroxy,

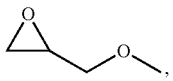

and
—$(CH_2OH)_xCH_2OH$ wherein X is 1 to 14.

25. The capacitor of claim 20 wherein said glycidyl ether is selected from the group consisting of:

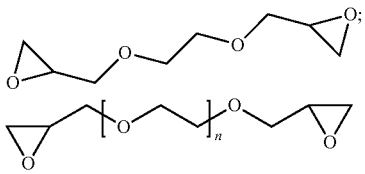

where n is an integer of 1 to 220;

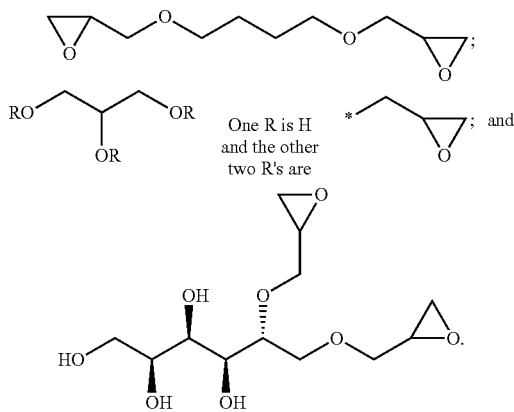

26. The capacitor of claim 1 further wherein said cathode further comprises a carboxylic acid.

27. The capacitor of claim 26 wherein said carboxylic acid is an aromatic acid with carboxylic groups.

28. The capacitor of claim 27 wherein said aromatic acid is selected from the group consisting of phthalic acid and benzoic acid.

29. The capacitor of claim 28 wherein said phthalic acid is ortho-phthalic acid.

30. The capacitor of claim 1 wherein said organic compound is a carboxylic crosslinking compound with two or more carboxylic acid groups.

31. The capacitor of claim 30 wherein said carboxylic crosslinking compound is aromatic acid with carboxylic groups.

32. The capacitor of claim 31 wherein said carboxylic crosslinking compound is selected from the group consisting of: oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid and polyacrylic acid.

33. A method for forming a capacitor comprising:
  forming an anode;
  forming a dielectric on said anode; and
  forming a cathode on said dielectric comprising:
    forming a conductive layer comprising:
      applying an oxidant and 3,4-ethylenedioxythiophene) monomer to form poly(3,4-ethylenedioxythiophene) in-situ thereby forming a first conductive layer;
      applying a conductive polymer dispersion over said first conductive layer wherein said conductive polymer dispersion comprises repeating units of —$(CR^1R^2CR^3R^4)$— wherein at least one of $R^1$, $R^2$, $R^3$ or $R^4$ comprises a group selected from thiophene, pyrrole or aniline with the proviso that none of $R^1$, $R^2$, $R^3$ or $R^4$ contain SOON or COOH;
    0.0005 to 0.1000 grams of an organofunctional silane per gram of said conductive polymer dispersion; and
    0.001 to 0.100 grams of an organic compound per gram of said conductive polymer dispersion with two or more functional groups selected from the group consisting of epoxy and carboxylic acid.

34. The method for forming a capacitor of claim 33 wherein said forming a cathode further comprises forming a carbon containing layer.

35. The method for forming a capacitor of claim 33 wherein said forming a cathode further comprises forming a metal containing layer.

36. The method for forming a capacitor of claim 33 wherein said applying a conductive polymer dispersion comprises applying a conductive polymer dispersion comprising said conductive polymer.

37. The method for forming a capacitor of claim 36 wherein said conductive polymer dispersion comprises at least one of said organofunctional silane or said organic compound.

38. The method for forming a capacitor of claim 37 wherein said conductive polymer dispersion comprises said organofunctional silane.

39. The method for forming a capacitor of claim 36 wherein said conductive polymer dispersion further comprises a polyanion.

40. The method for forming a capacitor of claim 39 wherein said polyanion is polystyrene sulfonic acid.

41. The method for forming a capacitor of claim 33 wherein said conductive polymer dispersion comprises a polythiophene.

42. The method for forming a capacitor of claim 41 wherein said polythiophene is poly(3,4-ethylenedioxy thiophene).

43. The method for forming a capacitor of claim 33 wherein said organofunctional silane is a glycidyl silane.

44. The method for forming a capacitor of claim 43 wherein said glycidyl silane is defined by the formula:

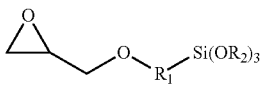

wherein $R_1$ is an alkyl of 1 to 14 carbons; and
each $R_2$ is independently an alkyl of 1 to 6 carbons.

45. The method for forming a capacitor of claim 44 wherein said $R_1$ is selected from the group consisting of methyl, ethyl and propyl.

46. The method for forming a capacitor of claim 44 wherein said glycidyl silane is:

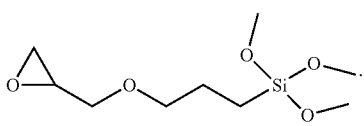

47. The method for forming a capacitor of claim 33 wherein said organic compound is a glycidyl ether.

48. The method for forming a capacitor of claim 33 wherein said organofunctional silane is defined by the formula:

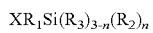

$$XR_1Si(R_3)_{3-n}(R_2)_n$$

wherein X is an organic functional group selected from the group consisting of amino, epoxy, anhydride, hydroxy, mercapto, sulfonate, carboxylate, phosphonate, halogen, vinyl, methacryloxy, ester and alkyl;
$R_1$ is an aryl or $(CH_2)_m$ wherein m can be 0 to 14;
$R_2$ is individually a hydrolysable functional group;
$R_3$ is individually an alkyl functional group of 1-6 carbons; and
n is 1 to 3.

49. The method for forming a capacitor of claim 48 wherein said hydrolysable functional group is selected from the group consisting of alkoxy, acyloxy, halogen and amine.

50. The method for forming a capacitor of claim 33 wherein said organofunctional silane is defined by the formula:

$$Y(Si(R_3)_{3-n}(R_2)_n)_2$$

wherein Y is any organic moiety that contains reactive or nonreactive functional groups, such as alkyl, aryl, sulfide or melamine;
$R_2$ is individually a hydrolysable functional group;
$R_3$ is individually an alkyl functional group of 1-6 carbons; and
n is 1 to 3.

51. The method for forming a capacitor of claim 33 wherein said organofunctional silane is selected from the group consisting of: 3-glycidoxypropyltrimethoxysilane, 3-aminopropyltriethoxysilane, aminopropylsilanetriol, (triethoxysilyl)propylsuccinic anhydride, 3-mercaptoprpyltrimethoxysilane, vinyltrimethoxysilane, 3-metacryloxypropyltrimethoxysilane, 3-trihydroxysilyl-1-propane sulfonic acid and octyltriethyoxysilane.

52. The method for forming a capacitor of claim 33 wherein said organic compound is an epoxy crosslinking compound.

53. The method for forming a capacitor of claim 52 wherein said epoxy crosslinking compound is defined by the formula:

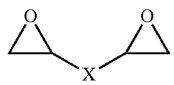

wherein the X is an alkyl or substituted alkyl of 0-14 carbons, an aryl or substituted aryl, an ethylene ether or substituted ethylene ether, polyethylene ether or substituted polyethylene ether with 2-20 ethylene ether groups or combinations thereof.

54. The method for forming a capacitor of claim 53 wherein said substitute is an epoxy group.

55. The method for forming a capacitor of claim 53 wherein alkyl or substituted alkyl has 0-6 carbons.

56. The method for forming a capacitor of claim 53 wherein said epoxy crosslinking is selected from the group consisting of: ethylene glycol diglycidyl ether, propylene glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl ether, glycerol polyglycidyl ethers, diglycerol polyglycidyl ethers, trimethylolpropane polyglycidyl ethers, sorbitol diglycidyl ether, sorbitol polyglycidyl ether, polyethylene glycol diglycidyl ether, polypropylene glycol diglycidyl ether, polytetramethylene glycol diglycidyl ether, di(2,3-epoxypropyl) ether, 1,3-butadiene diepoxide, 1,5-hexadiene diepoxide, 1,2,7,8-diepoxyoctane, 1,2,5,6-Diepoxycyclooctane, 4-vinyl cyclohexene diepoxide, bisphenol diglycidyl ether and a maleimide-epoxy compound.

57. The method for forming a capacitor of claim 56 wherein said epoxy crosslinking compound is a glycidyl ether.

58. The method for forming a capacitor of claim 57 wherein said glycidyl ether is defined by the formula:

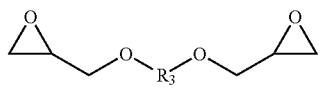

wherein $R_3$ is an alkyl or substituted alkyl of 1-14 carbons or the atoms necessary to form at least one ethylene ether linkage.

59. The method for forming a capacitor of claim 58 wherein said $R_3$ is an alkyl or substituted alkyl of 2-6 carbons.

60. The method for forming a capacitor of claim 58 wherein said $R_3$ is a polyethylene ether.

61. The method for forming a capacitor of claim 60 wherein said polyethylene ether has 2-220 polymerized ethylene ether groups.

62. The method for forming a capacitor of claim 58 wherein said $R_3$ is an alkyl substituted with a group selected from the group consisting of hydroxy,

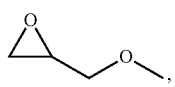

and
—$(CH_2OH)_xCH_2OH$ wherein X is 1 to 14.

63. The method for forming a capacitor of claim 57 wherein said glycidyl ether is selected from the group consisting of:

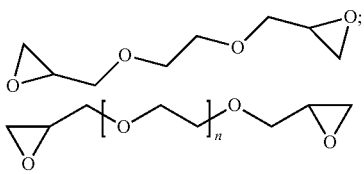

where n is an integer of 1 to 220;

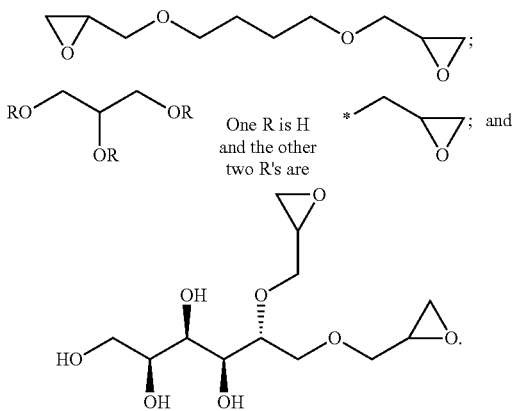

64. The method for forming a capacitor of claim 33 further wherein said cathode further comprises a carboxylic acid.

65. The method for forming a capacitor of claim 64 further wherein said carboxylic acid is an aromatic acid.

66. The method for forming a capacitor of claim 65 further wherein said aromatic acid is selected from the group consisting of phthalic acid and benzoic acid.

67. The method for forming a capacitor of claim 66 wherein said phthalic acid is ortho-phthalic acid.

68. The method for forming a capacitor of claim 33 wherein said organic compound is a carboxylic crosslinking compound with two or more carboxylic acid groups.

69. The method for forming a capacitor of claim 68 wherein said carboxylic crosslinking compound is aromatic acid with carboxylic groups.

70. The method for forming a capacitor of claim 69 wherein said carboxylic crosslinking compound is selected from the group consisting of: oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid and polyacrylic acid.

71. The capacitor of claim 1 wherein said anode comprises a pressed powder.

72. The capacitor of claim 1 further comprising decanediamine toluenesulfonate in alternating layers with said conductive polymer.

73. The method for forming a capacitor of claim 33 further comprising forming at least one decanediamine toluenesulfonate layer adjacent said conductive polymer dispersion layer.

* * * * *